US008184356B2

(12) United States Patent
Kweon et al.

(10) Patent No.: US 8,184,356 B2

(45) Date of Patent: May 22, 2012

(54) MICRO THIN-FILM STRUCTURE, MEMS SWITCH EMPLOYING SUCH A MICRO THIN-FILM, AND METHOD OF FABRICATING THEM

(75) Inventors: Soon-cheol Kweon, Seoul (KR); Hyung-jae Shin, Seongnam-si (KR); Byung-hee Jeon, Seongnam-si (KR); Seok-kwan Hong, Seoul (KR); Che-heung Kim, Yongin-si (KR); Sang-hun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/782,386

(22) Filed: May 18, 2010

(65) Prior Publication Data

US 2010/0225990 A1 Sep. 9, 2010

Related U.S. Application Data

(63) Continuation of application No. 11/230,502, filed on Sep. 21, 2005, now Pat. No. 7,746,536.

(30) Foreign Application Priority Data

Oct. 27, 2004 (KR) ................................ 2004-86056

(51) Int. Cl.
*G02B 26/00* (2006.01)

(52) U.S. Cl. ........................................................ 359/290

(58) Field of Classification Search .................. 359/290, 359/291, 292, 293, 295, 298, 220, 223, 222, 359/224, 320, 322, 323, 324; 310/309, 310; 318/116

See application file for complete search history.

(56) References Cited

U.S. PATENT DOCUMENTS 5,834,324 A * 11/1998 Nakamoto ...................... 438/20

(Continued)

FOREIGN PATENT DOCUMENTS

JP 7-322649 A 12/1995

(Continued)

OTHER PUBLICATIONS

United States Patent and Trademark Office, "Non-Final Office Action," issued in connection with U.S. Appl. No. 12/782,418, dated Nov. 15, 2010.

(Continued)

*Primary Examiner* — Ricky Mack
*Assistant Examiner* — Tuyen Tra
(74) *Attorney, Agent, or Firm* — Sughrue Mion, PLLC

(57) ABSTRACT

A micro thin-film structure, a micro electro-mechanical system (MEMS) switch, and methods of fabricating them. The micro thin-film structure includes at least two thin-films having different properties and laminated in sequence to form an upper layer and a lower layer, wherein an interface between the upper and lower layers is formed to be oriented to at least two directions. The micro thin film structure, and method of forming, may be applied to a movable electrode of an MEMS switch. The thin-film structure may be formed by forming through-holes in the lower layer, and depositing the upper layer in the form of being engaged in the through-holes. Alternatively, the thin-film structure may be made by forming prominence and depression parts on the top side of the lower layer and then depositing the upper layer on the top side of the lower layer having the prominence and depression parts.

3 Claims, 14 Drawing Sheets

U.S. PATENT DOCUMENTS

| | | | |
|---|---|---|---|
| 5,893,948 | A | 4/1999 | Nickel et al. |
| 6,274,497 | B1 * | 8/2001 | Lou ............................... 438/687 |
| 6,538,798 | B2 | 3/2003 | Miller et al. |
| 6,563,106 | B1 | 5/2003 | Bowers et al. |
| 6,642,593 | B2 | 11/2003 | Lin et al. |
| 6,707,593 | B2 | 3/2004 | Le et al. |
| 6,992,551 | B2 | 1/2006 | Shimizu et al. |
| 7,099,060 | B2 | 8/2006 | Nanjyo et al. |
| 7,259,940 | B2 | 8/2007 | Tanaka et al. |
| 7,507,663 | B2 | 3/2009 | Shepard |
| 7,601,270 | B1 | 10/2009 | Unger et al. |
| 2002/0027487 | A1 | 3/2002 | Suzuki |
| 2003/0042117 | A1 | 3/2003 | Ma |
| 2004/0012838 | A1 | 1/2004 | Huibers |
| 2004/0017644 | A1 | 1/2004 | Goodwin-Johansson |
| 2005/0122560 | A1 | 6/2005 | Sampsell et al. |

FOREIGN PATENT DOCUMENTS

| | | |
|---|---|---|
| JP | 2004-261884 A | 9/2004 |

OTHER PUBLICATIONS

Communication dated Jun. 1, 2010, issued by the Japanese Patent Office in counterpart Japanese Application No. 2005-310583.

* cited by examiner

MICRO THIN-FILM STRUCTURE, MEMS SWITCH EMPLOYING SUCH A MICRO THIN-FILM, AND METHOD OF FABRICATING THEM

CROSS-REFERENCE TO RELATED APPLICATIONS

This application is Continuation of U.S. application Ser. No. 11/230,502 filed Sep. 21, 2005, the disclosure of which is incorporated herein by reference. This application claims priority from Korean Patent Application No. 2004-86056, filed on Oct. 27, 2004, in the Korean Intellectual Property Office, the disclosure of which is incorporated herein by reference.

BACKGROUND OF THE INVENTION

1. Field of the Invention

The present invention relates to a micro thin-film structure, a MEMS (Micro Electro-Mechanical System) switch employing such a micro thin-film structure, and methods of fabricating the micro thin-film structure and the MEMS switch, and in particular to a micro thin-film structure, which is improved in lamination structure to minimize the deformation of the micro thin-film structure and allows a MEMS switch to be stably operated when the micro thin-film structure is applied to a movable electrode of the MEMS switch, a MEMS switch employing such a micro thin-film structure, and methods of fabricating them.

2. Description of the Related Art

Among RF devices fabricated using MEMS techniques, switches are most widely manufactured at present. RF switches are frequently applied to circuits for signal selection and transmission or impedance matching in radio frequency communication terminals and systems of microwave band or millimeter wave band.

An example of such an RF switch is disclosed in Japanese Patent Publication No. Hei 10-334778 issued on Dec. 12, 1998 and entitled "Critical Microswitch and Its Manufacture."

Briefly, the microswitch comprises a movable electrode initially deformed by difference in residual stress, a fixed electrode spaced from the movable electrode, a movable electrode support portion for supporting both ends of the movable electrode, and a fixed electrode support portion for supporting the fixed electrode.

FIG. 1 is a perspective view showing a construction of a conventional MEMS switch, and FIG. 2 is a cross-sectional view taken along line I-I' of FIG. 1.

Referring to FIGS. 1 and 2, a signal line 3 having a dome-shaped contact 3*a* is formed on a substrate 2 at the central part of the top side of the substrate 2. A movable electrode 6 is positioned above the dome-shaped contact 3*a*, wherein the movable electrode 6 is fixed in a form of a simply-supported beam by spacers 4. A through-hole 3*b* is formed through the top of the dome-shaped contact 3*a*. A pair of fixed electrodes 7 are respectively positioned on the opposite sides of the signal line 3, wherein the fixed electrodes 7 cooperate with the movable electrode 6 to generate electrostatic force, thereby drawing the movable electrode 6 to come into contact with the dome-shaped contact 3*a*. The movable electrode 6 has a double thin-film structure having an electrode layer 6*a* formed from a conductive material and a reinforcement layer 6*b* formed on the top side of the electrode layer 6*a* to reinforce the strength of the electrode layer 6*a*.

In such a conventional MEMS switch, electrification is produced between the fixed electrodes when DC voltage is applied to the fixed electrodes 7 and the movable electrode 6 is drawn toward the substrate 2. As the movable electrode 6 is drawn, the central part of the movable electrode 6 comes into contact with the dome-shaped contact 3*a*.

In order to ensure the stable switching operation of such an MEMS switch, it is necessary for the movable electrode 6 to maintain a horizontal posture without being deformed. However, there is a problem in that because the length L of the movable electrode 6 is relatively very large as compared to the distance d between the movable electrode 6 and the substrate 2, the movable electrode 6 is easily bent. Accordingly, a structure is demanded for effectively improving the flexural strength of the movable electrode 6.

However, the interface of the electrode layer 6*a* and the reinforcement layer 6*b* of the conventional movable electrode 6 is formed only as a horizontal plane A. Therefore, if stress is generated due to a difference in residual stress or thermal expansion coefficient caused in the electrode layer 6*a* and the reinforcement layer 6*b* after a thin-film has been formed, a face for canceling the generated stress is formed only by a horizontal plane. Therefore, there is a problem in that the effect of preventing the deformation of the movable electrode is insufficient.

Such deformation of a thin film structure may cause a problem not only in the above-mentioned MEMS switch but also in other devices employing MEMS techniques.

SUMMARY OF THE INVENTION

Accordingly, the present invention has been made to solve the above-mentioned problems, and an object of the present invention is to provide a micro thin-film structure improved in lamination structure to reduce the deformation of the thin-film structure.

A second object of the present invention is to provide a MEMS switch improved in lamination structure of a movable electrode of the MEMS switch to reduce the deformation of the movable switch, so that the movable electrode can perform stable switching operation.

A third object of the present invention is to provide a method of manufacturing a micro thin-film structure, which improves step of laminating a thin-film of the micro thin-film structure to reduce the deformation of the thin-film structure.

A fourth object of the present invention is to provide a method of manufacturing a MEMS switch, which includes a step of laminating a thin film of a movable electrode of the MEMS switch to reduce the deformation of the movable electrode, so that the movable electrode can perform stable switching operation.

According to a first aspect of the present invention for achieving the above-mentioned objects, there is provided a micro thin-film structure including at least two thin-films having different physical properties and laminated in sequence to form an upper layer and a lower layer, wherein an interface between the upper and lower layers is formed to be oriented to at least two directions.

The top side of the lower layer may have prominence and depression parts and the bottom side of the upper layer may have a shape complementary to the prominence and depression parts of the lower layer.

The lower layer may be formed with plural through-holes, and the upper layer may be formed to extend on the inner circumferential surfaces of the plural through-holes as well as on the top side of the lower layer. The through-holes may be formed in a shape selected from a group consisting of polygonal, circular and elliptical shapes.

According to a second aspect of the present invention, there is provided a MEMS switch including a substrate; a signal line formed on a top side of the substrate; and a movable electrode formed spaced apart from the substrate to electrically contact with the signal line, wherein the movable electrode includes an electrode layer and a reinforcement layer formed on the top side of the electrode layer, and wherein an interface between the electrode layer and the reinforcement layer is formed to be oriented to at least two directions.

The top side of the electrode layer may haves prominence and depression parts and the bottom side of the reinforcement layer has a shape complementary to the prominence and depression parts of the lower layer.

The electrode layer may be formed with plural through-holes, and the reinforcement layer is formed to extend on the inner circumferential surfaces of the plural through-holes as well as on the top side of the lower layer. The through-holes may be formed in a shape selected from a group consisting of polygonal, circular and elliptical shapes.

According to a third aspect of the present invention, there is provided a method of fabricating a micro thin-film structure including a step of laminating at least two thin-film having different properties to form upper and lower layers in sequence, wherein an interface between the upper and lower layers is formed to be oriented to at least two directions.

Forming the interface between the upper and lower layers to be oriented to at least two directions may include the steps of depositing the lower layer to a predetermined thickness on a substrate; patterning the lower layer to form through-holes; and depositing the upper layer to a predetermined thickness on the top side of the lower layer in such a way that the upper layer extends to the inner circumferential surfaces of the through-holes in the form of being engaged in the through-holes, wherein the through-holes may be formed in a shape selected from a group consisting of polygonal, circular and elliptical shapes.

Alternatively, forming the interface between the upper and lower layers to be oriented to at least two directions may include the steps of depositing the lower layer to a predetermined thickness on a substrate; depositing a prominence and depression forming layer, made of the same material as the lower layer, on the lower layer to a predetermined thickness; patterning the prominence and depression forming layer to form prominence and depression parts on the lower layer; and depositing the upper layer to a predetermined thickness on the top side of the lower layer formed with the prominence and depression parts.

According to a fourth aspect of the present invention, there is provided a method of manufacturing an MEMS switch including the steps of forming a signal line on a substrate; and forming a movable electrode, which is positioned spaced apart from the substrate to electrically contact with the signal line, wherein step of forming the movable electrode includes steps of depositing an electrode layer, and depositing a reinforcement layer on the top side of the electrode layer, wherein an interface between the electrode layer and the reinforcement layer is formed to be oriented to at least two directions.

Forming the interface between the electrode layer and the reinforcement layer to be oriented to at least two directions may include the steps of patterning the electrode layer to form plural through-holes after the electrode has been deposited to a predetermined thickness; and depositing the reinforcement layer to a predetermined thickness on the top side of the electrode in such a way that the reinforcement layer is extended to the inner circumferential surfaces of the through-holes, wherein the through-holes may be formed in a shape selected from a group consisting of polygonal, circular and elliptical shapes.

According to an exemplary embodiment, a sacrifice layer may be laminated between the movable electrode and the substrate, and the through-holes may be used to remove the sacrifice layer in such a way that the movable electrode is formed to be spaced from the signal line.

Moreover, forming the interface between the electrode layer and the reinforcement layer to be oriented to at least two directions may include the steps of: depositing a prominence and depression forming layer having the same physical properties as the electrode layer after the electrode layer has been deposited to a predetermined thickness; patterning the prominence and depression forming layer to form prominence and depression parts on the electrode layer; and depositing the reinforcement layer to a predetermined thickness on the top side of the electrode layer formed with the prominence and depression parts.

BRIEF DESCRIPTION OF THE DRAWINGS

The above aspects and features of the present invention will be more apparent from the description for certain embodiments of the present invention taken with reference to the accompanying drawings, in which.

DETAILED DESCRIPTION OF THE EXEMPLARY NON-LIMITING EMBODIMENTS OF THE INVENTION

Hereinbelow, the exemplary embodiments of the present invention will be described in more detail with reference to the accompanying drawings.

The matters defined in the description such as a detailed arrangement and elements are nothing but the ones provided to assist in a comprehensive understanding of the invention. Thus, it is apparent that the present invention can be carried out without those defined matters. Also, well-known functions or arrangements in the art are not described in detail since they would unnecessarily obscure the invention. Further, the constructions shown in accompanying drawings are depicted in an enlarged scale as compared to practical sizes thereof.

The inventive micro thin-film structure has two thin-films different in physical property and deposited in sequence to form upper and lower layers, wherein the interface between the upper and lower layers are formed to be oriented to two directions so as to minimize the deformation of the thin-film structure.

Figure 1:
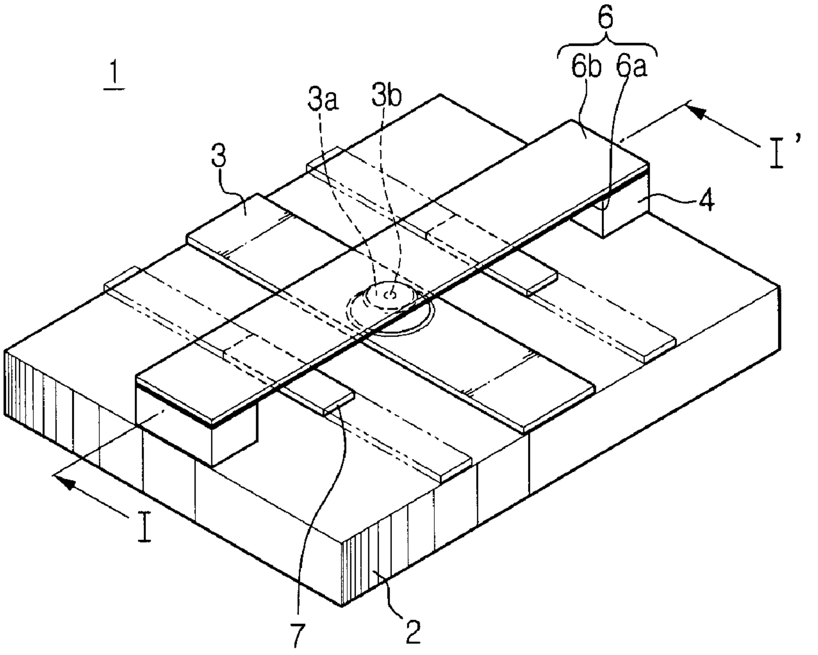
FIG. 1 (PRIOR ART)
FIG. 1 is a perspective view showing a construction of a conventional MEMS switch.
Figure 2:
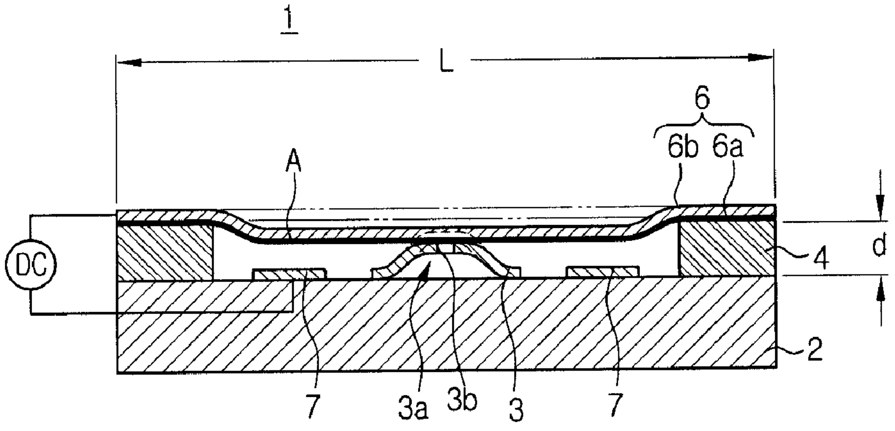
FIG. 2 (PRIOR ART)
FIG. 2 is a cross-sectional view taken along line I-I' of FIG. 1.
Figure 3:
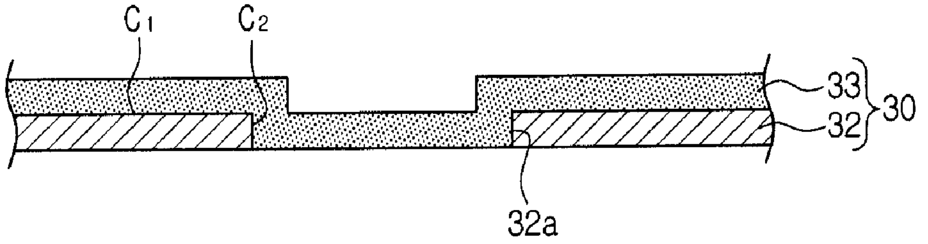
FIG. 3 is a view showing a part of a micro thin-film structure 30 according to an exemplary embodiment of the present invention.

FIG. 3 shows a part of a micro thin-film structure 30 according to an exemplary embodiment of the present invention.

Referring to FIG. 3, the micro thin-film structure 30 comprises a lower layer 32 formed with plural through-holes 32*a* and an upper layer 33 formed to extend on the top surface of the lower layer 32 as well as on the inner circumferential surfaces of the plural through-holes 32*a*, so that the upper layer 31 is formed in an arrangement engaged in the plural through-holes 32*a* of the lower layer 32. At this time, the through-holes 32 may be take various shapes including polygonal, circular, elliptical shapes, for example.

With the above-mentioned construction, because the interface between the lower layer 32 and the upper layer 33 is oriented to the two directions of horizontal plane $C_1$ and vertical plane $C_2$, the stress cancellation effect of the thin film structure can be improved when stress is produced due to difference in residual stress and thermal expansion coefficient between the lower layer 32 and the upper layer 33. Therefore, the flexural rigidity of the thin-film structure 30 can be increased and the deformation of the thin-film structure 30 can be minimized.

Figure 4:
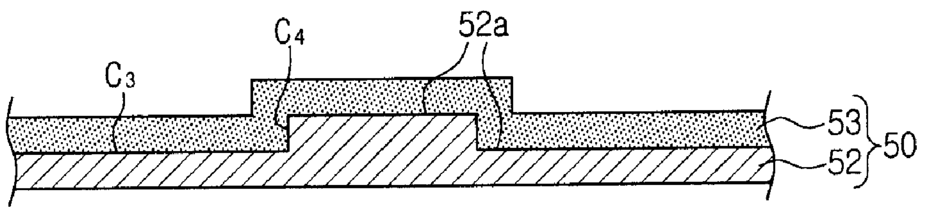
FIG. 4 is a view showing a part of a micro thin-film structure 50 according to another exemplary embodiment of the present invention.

FIG. 4 shows another construction of a thin-film structure 50 according to another exemplary embodiment of the invention.

Referring to FIG. 4, the top side of the lower layer 52 is formed with prominence and depression parts 52*a* and the bottom side of the upper layer 53 is formed in a complementary shape in relation to that of the top side of the lower layer 52.

In this construction, the interface between the two layers is also oriented to two directions of horizontal plane $C_3$ and vertical plane $C_4$. Therefore, it is possible to minimize the deformation of the thin-film structure 50.

Figure 5A:
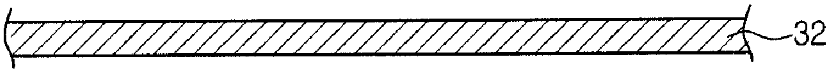
FIGS. 5A to 5C are views showing steps of fabricating the thin-film structure 30 of FIG. 3.
Figure 5B:
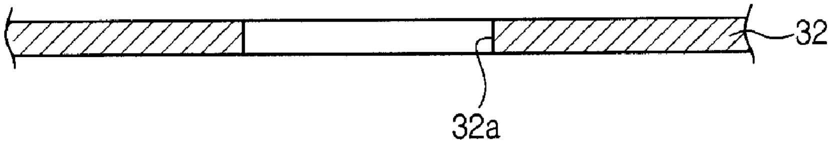
Figure 5C:
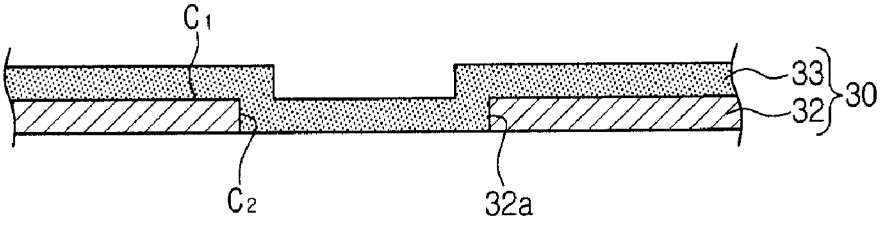

FIGS. 5A to 5C show steps of fabricating the thin-film structure 30 of FIG. 3.

At first, a lower layer 32 is deposited to a predetermined thickness on a process layer or substrate (not shown) prepared in a previous step as shown in FIG. 5A.

Next, the lower layer 32 is patterned to form plural through-holes 32*a* as shown in FIG. 5B.

Finally, an upper layer 33 is deposited to a predetermined thickness on the top side of the lower layer 32, in which the upper layer 33 is also deposited on the inner circumferential surfaces of the through-holes 32*a*, so that the interface between the upper and lower layers is oriented to the two directions of horizontal plane $C_1$ and vertical plane $C_2$, as shown in FIG. 5C.

Figure 6A:
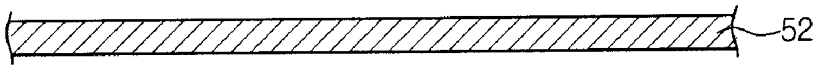
FIGS. 6A to 6C are views showing steps of fabricating the thin-film structure 50 of FIG. 4.
Figure 6B:
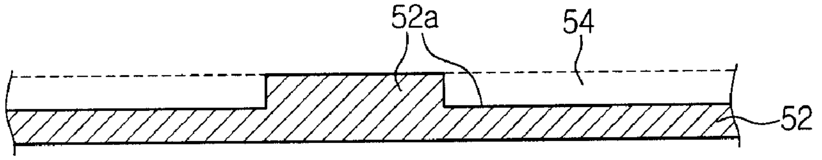
Figure 6C:
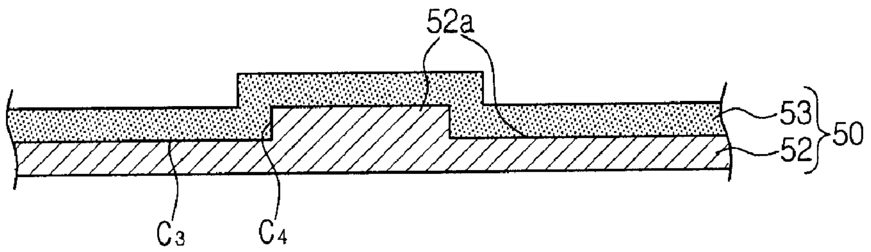

FIGS. 6A to 6C show steps of fabricating the thin-film structure 50 of FIG. 4.

At first, a lower layer 52 is deposited to a predetermined thickness on a process layer or substrate (not shown) prepared in previous step as shown in FIG. 6A.

Next, a second lower layer 54 is deposited on the lower layer 52 to a predetermined thickness, wherein the material of the second lower layer 54 is the same as that of the lower layer 52, and then the second lower layer 54 is patterned to form prominence and depression parts 52*a*, as shown in FIG. 6B.

Finally, an upper layer 53 is deposited to a predetermined thickness on the top side of the lower layer 52 formed with prominence and depression parts, so that the interface between the upper and lower layers is oriented to the two directions of horizontal plane $C_3$ and vertical plane $C_4$, as shown in FIG. 6C.

Figure 7:
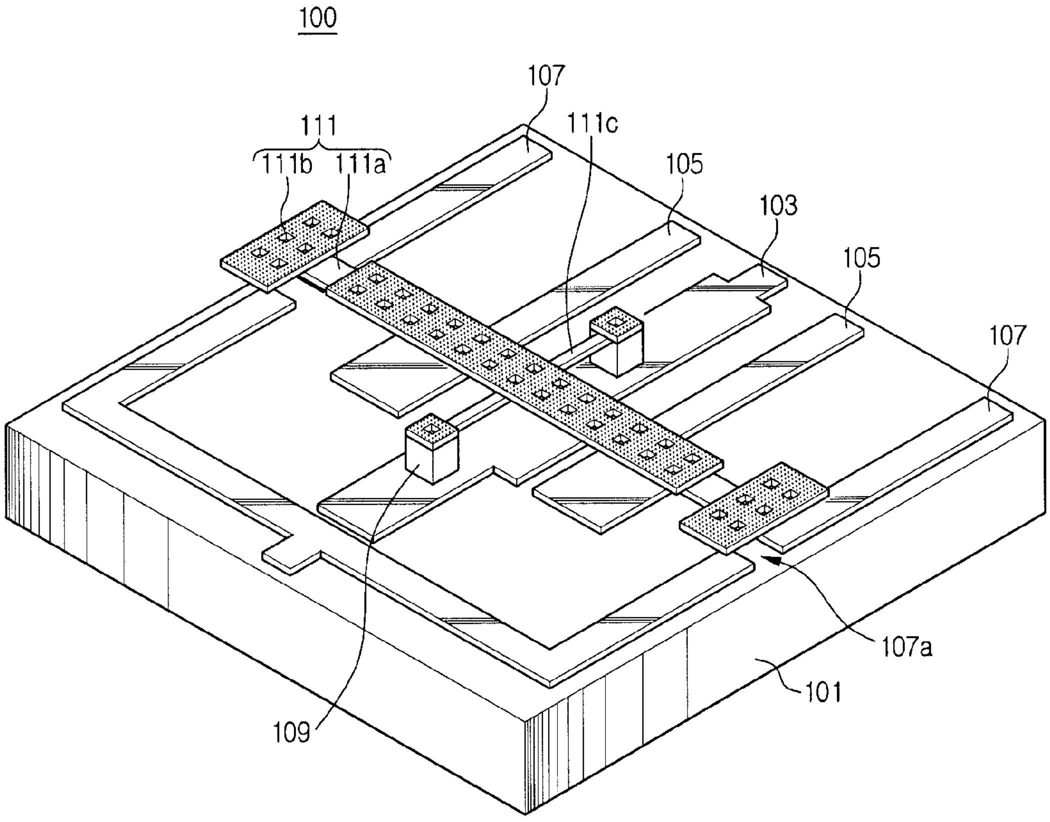
FIG. 7 is a perspective view schematically showing a construction of an MEMS switch 100 according to an exemplary embodiment of the present invention.
Figure 8:
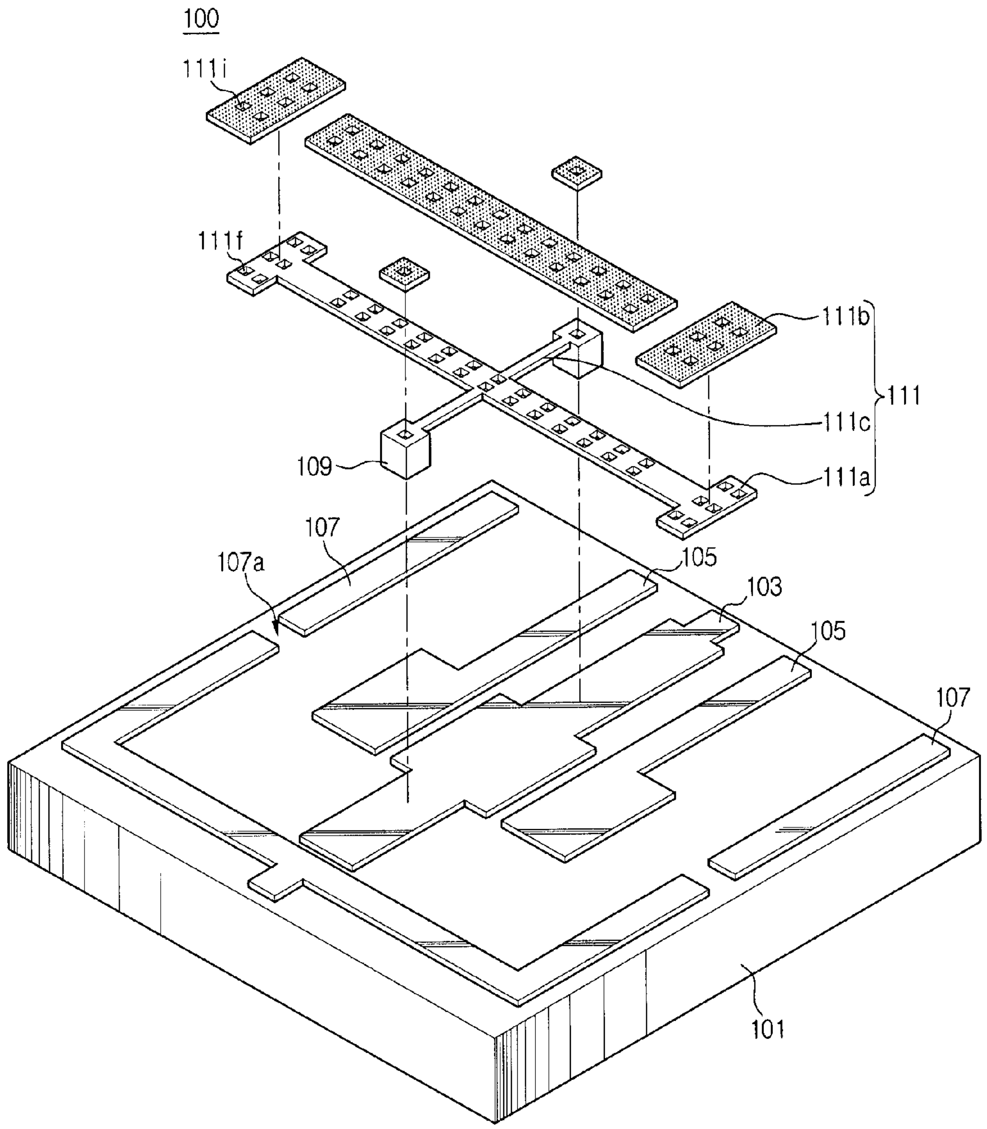
FIG. 8 is an exploded perspective view of the MEMS switch of FIG. 7.
Figure 9:
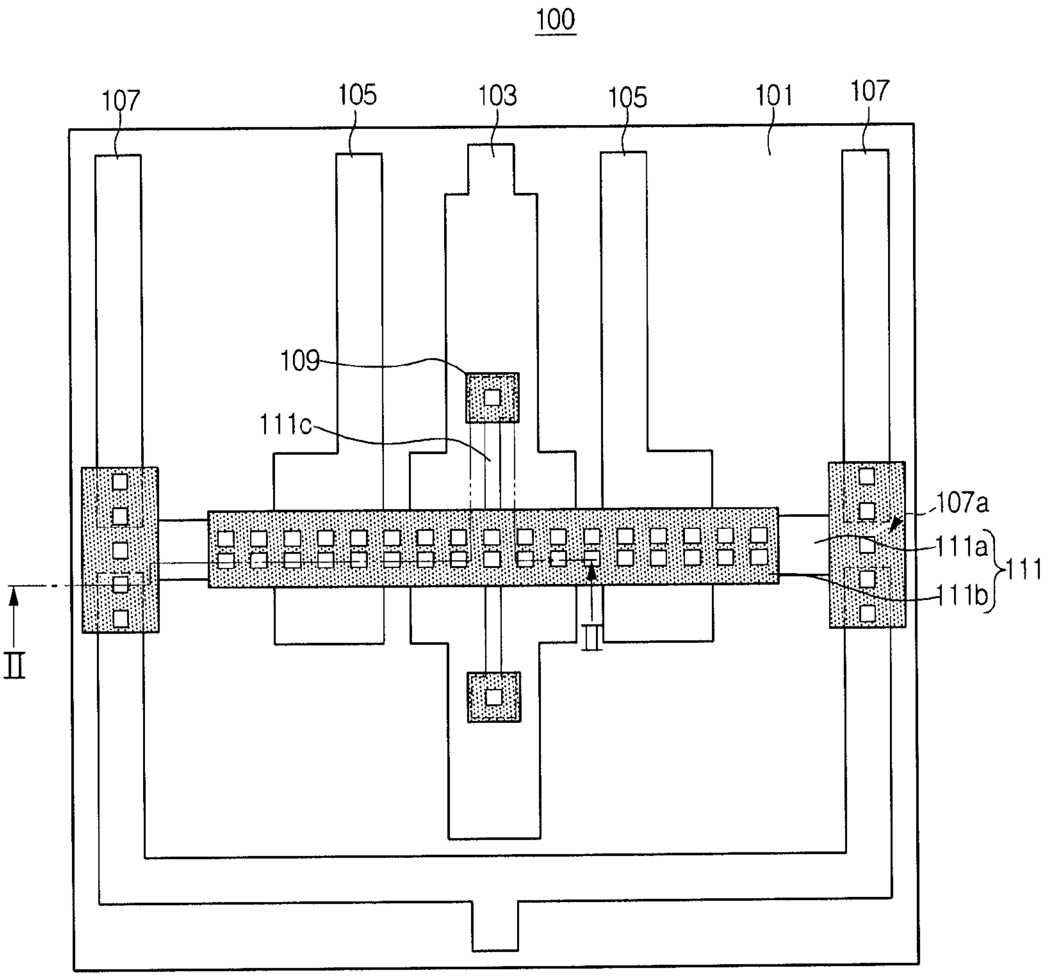
FIG. 9 is a top plan view of the MEMS switch of FIG. 7.

FIG. 7 is a perspective view schematically showing the construction of an MEMS switch 100 according to an exemplary embodiment of the present invention, FIG. 8 is an exploded perspective view of the MEMS switch 100, and FIG. 9 is a top plan view.

Referring to FIGS. 7 to 9, a ground line 103, one or more fixed electrodes 105 and one or more signal lines 107 are formed on the top side of the substrate 101 with a predetermined space being provided between them, wherein the ground line 103 is positioned at the central area between the fixed electrodes 105 (or the signal lines 107). Although it is possible to provide one fixed electrode 105 and one signal line 107, it is usual to provide a pair of fixed electrodes and a pair of signal lines, in such a manner that the fixed electrodes 105 and the signal lines 107 have a symmetrical arrangement with reference to the ground line 103, respectively.

In addition, a movable electrode 111 is provided at the longitudinal central part of the substrate 101 in a distance spaced from the signal lines 107 to perform seesaw movement about the central part thereof, so that the movable electrode 111 comes into selective contact with the contact portions 107*a* of the signal lines 107. The movable electrode 111 is a double thin-film structure with an electrode layer 111*a* and a reinforcement layer 111*b* formed on the top surface of the electrode layer 111*a*.

For the seesaw movement, the center part of the electrode layer 111*a* is connected to the top portions of spacers 109 through springs 111*c*, which extend from the opposite sides of the electrode layer 111*a* at the longitudinal central part thereof substantially vertical to the electrode layer 111*a*. The spacers 109 are in contact with the ground line 103 to ground the movable electrode 111.

Figure 10A:
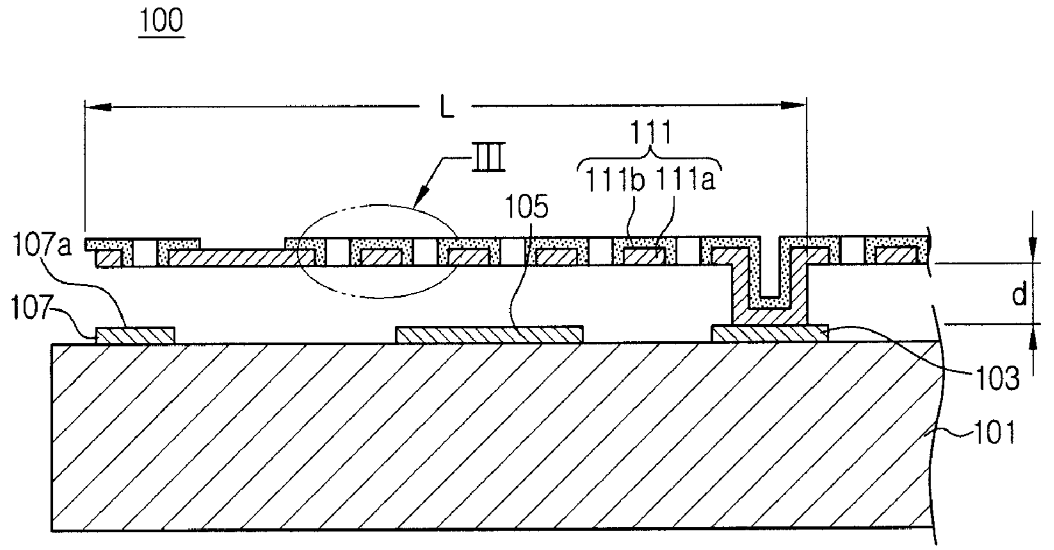
FIGS. 10A and 10B are views taken along line II-II' of FIG. 9, which illustrate the movement of an movable electrode of the inventive MEMS switch to come into contact with a signal line 107.
Figure 10B:
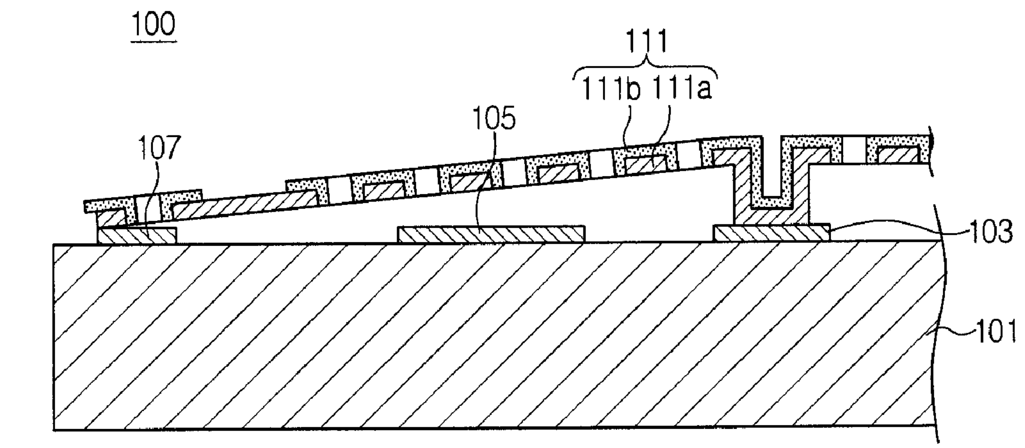

FIGS. 10A and 10B are cross-sectional views taken along line II-II' of FIG. 9, which illustrates the movement of the movable electrode 111 for coming into contact with the signal lines 107.

Referring to FIGS. 10A and 10B, if a predetermined level of voltage is applied to one of the fixed electrodes 105, electrification is produced between the voltage-applied fixed electrode 105 and one end of the movable electrode 111 corresponding to the electrode 105, whereby the one end of the movable electrode 111 is drawn toward the substrate 101 by electrostatic force. As a result, the one end of the movable electrode 111 comes into contact with a contact portion 107*a* of a corresponding signal line 107. If a predetermined level of voltage is applied to the other fixed electrode 105, the movable electrode 111 will perform seesaw movement to the opposite side and come into contact with the contact portion 107*a* of the other side signal line 107.

Because the movable electrode 111 is maintained at a distance d spaced from the substrate 101 and has a length L which is relatively larger than the distance d, the movable electrode 111 can be easily bent. Accordingly, there is potentially a problem that the switching movement is not stably performed.

However, according to an exemplary embodiment of the present invention, this problem is solved by applying the micro thin-film structures 30, 50 shown in FIGS. 3 and 4 to the movable electrode 111.

Figure 10C:
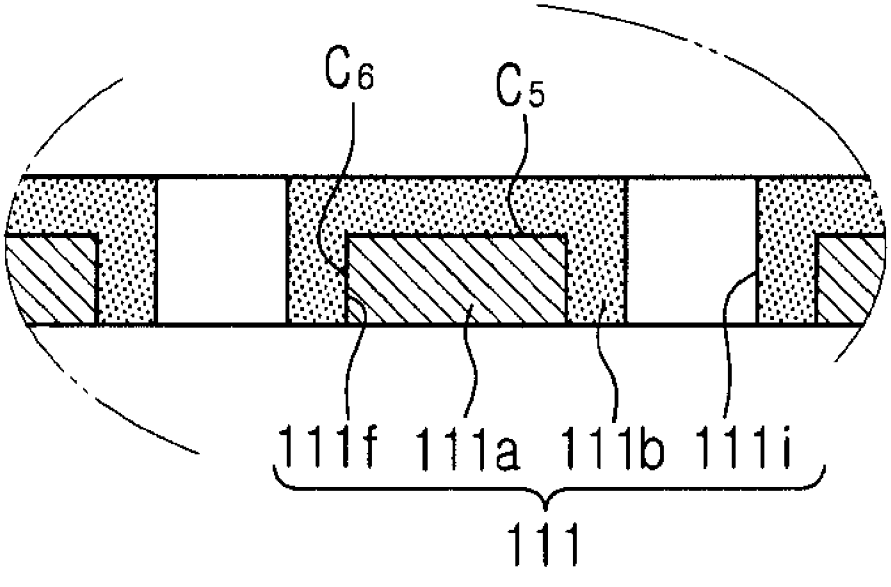
FIG. 10C is a view showing the part indicated by III in FIG. 10A in an enlarged scale.

FIG. 10C is a view showing the part indicated by III in FIG. 10A in an enlarged scale, which uses the construction of the micro thin-film structure 30 of FIG. 3.

Referring to FIG. 10C, plural through-holes 111*f* are formed in the electrode layer 111*a* and the reinforcement layer 111*b* is formed on the inner circumferential surfaces of the through-holes 111*f* as well as on the top side of the electrode layer 111*a*, whereby the reinforcement layer 111*b* is configured in the form of being engaged in the plural through-holes 111*f*. The reinforcement layer is patterned to form through-holes 111*i* to communicate with the through-holes in the electrode layer 111*a*.

Through this construction, the interface C5, C6 between the electrode layer 111*a* and the reinforcement layer 111*b* can cancel stress produced due to a difference in residual stress and/or thermal expansion coefficient between the electrode layer 111*a* and the reinforcement layer 111*b* of the movable electrode 111, whereby the deformation of the movable electrode 111 can be reduced. Therefore, the switching movement can be stably performed.

Figure 11A:
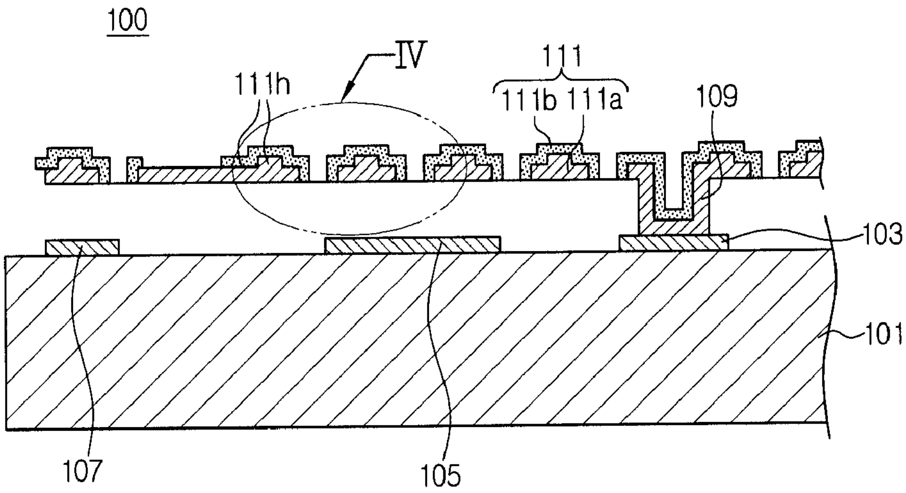
FIG. 11A is a view showing another construction for preventing deformation of the movable electrode 111 for the inventive MEMS switch 100, wherein the micro thin-film structure 50 of FIG. 4 is applied to the movable electrode 111.
Figure 11B:
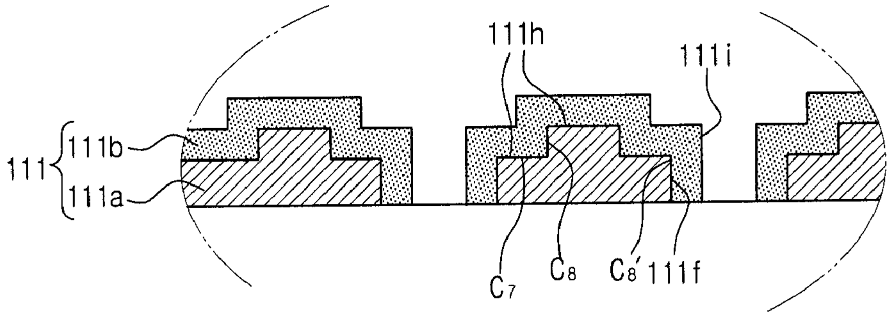
FIG. 11B is a view showing the part indicated by IV in FIG. 11A in an enlarged scale.

FIG. 11A shows another construction for preventing the deformation of the movable electrode 111 for the inventive MEMS switch 100, to which the micro thin-film structure 50 of FIG. 4 is applied, and FIG. 11B shows the part indicated by IV in FIG. 11A in an enlarged scale.

Referring to FIGS. 11A and 11B, prominence and depression parts 111*h* are formed on the top side of the electrode layer 111*a*, and the reinforcement layer 111*b* is formed in a shape complementary to the prominence and depression parts 111*h*. With this construction, the interface between the electrode layer 111*a* and the reinforcement layer 111*b* can cancel stress produced in the movable electrode 111, thereby minimizing the deformation of the movable electrode 111. In this embodiment, the through-holes 111*f* can be formed in the electrode layer 111*a* as shown in FIGS. 10A to 10C and the reinforcement layer 111*b* can be deposited through the through-holes 111*f* so that the reinforcement layer 111*b* is configured in the form of being engaged in the through-holes 111*f*. If this construction is employed, the stress cancellation interface is increased because in addition to the horizontal interface $C_7$ and vertical interface $C_8$, an additional vertical interface $C_8'$ is provided, whereby the flexural strength of the movable electrode 111 is further increased.

FIGS. 12A to 12E are cross-sectional views showing steps of fabricating the inventive MEMS switch 100 shown in FIGS. 10A to 10C.

Figure 12A:
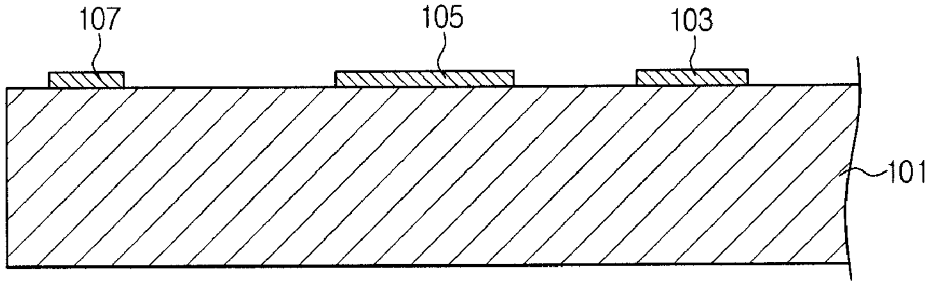
FIGS. 12A to 12E are cross-sectional views showing steps of fabricating the inventive MEMS switch 100 shown in FIGS. 10A to 10C.

At first, a conductive layer is deposited on a substrate 101 to a predetermined thickness and then patterned to form a ground line 103, one or more fixed electrodes 105, and one or more signal lines 107, as shown in FIG. 12A.

Figure 12B:
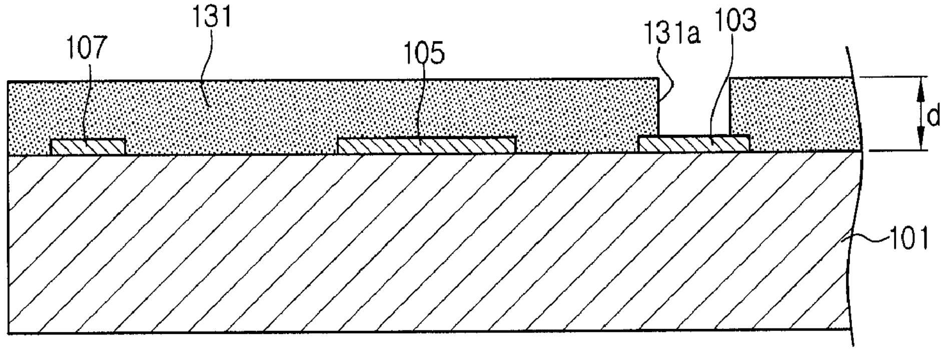

Following this, a sacrifice layer 131 is formed on the entire surface of the substrate 101 as shown in FIG. 12B. The sacrifice layer 131 serves to make the electrode layer 111*a* of the movable electrode 111 come into contact with the ground layer 103 and to maintain the movable electrode 111 at a distance d spaced apart from the substrate 101, and a contact hole 131*a* is formed in the sacrifice layer 131, wherein a spacer 109 to be laminated in the next step will be formed to be engaged in the contact holes 131*a*.

Next, aluminum is deposited to a predetermined thickness on the top surface of the sacrifice layer 131 to form the electrode layer 111*a* of the movable electrode 111. The electrode layer 111*a* is deposited while being in contact with the ground line 103 through the contact hole 131*a*. In order to etch the sacrifice layer 131, the electrode layer 111*a* is patterned to form through-holes 111*f*. The through-holes 111*f* are same with the through-holes 111*f* of FIG. 10C, wherein the through-holes 111*f* are employed for use in preventing the deformation of the movable electrode 111 as well as in etching the sacrifice layer 131.

Figure 12C:
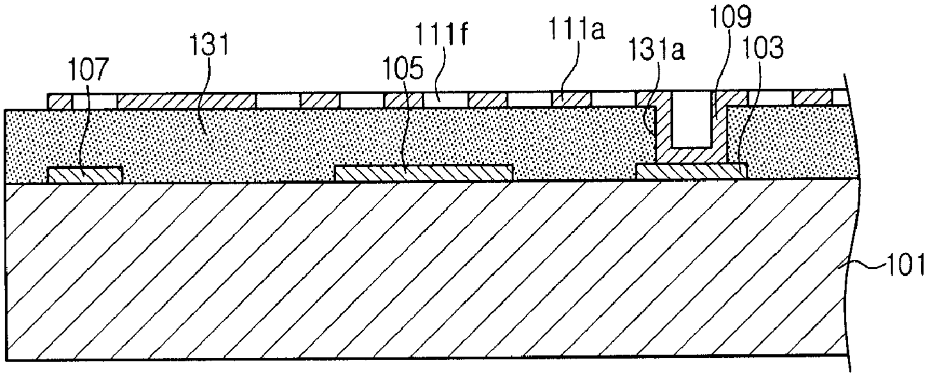
Figure 12D:
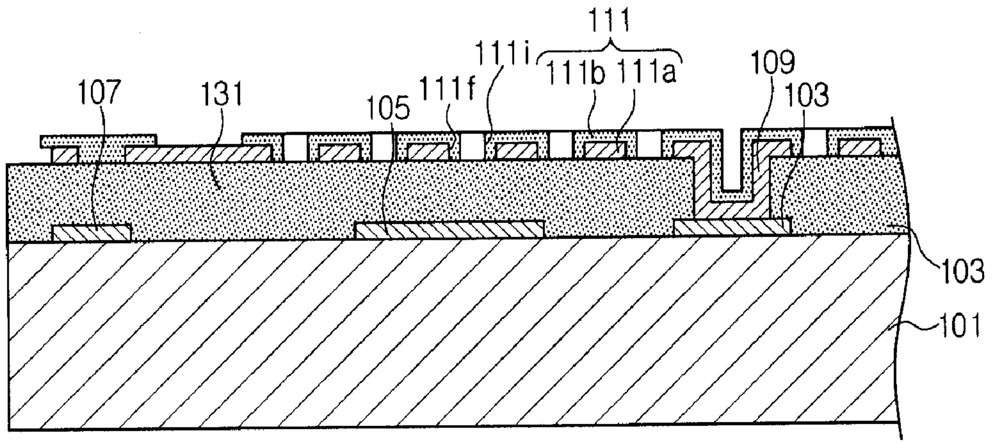

In addition, silicon nitride is deposited on the top surface of the electrode layer 111*a* to a predetermined thickness to form the reinforcement layer 111*b*, as shown in FIG. 12D. The reinforcement layer 111*b* is deposited on the inner circumferential surfaces of the through-holes 111*f* as well as on the top surface of the electrode layer 111*a*, thereby increasing the flexural strength of the movable electrode 111. In order to etch the sacrifice layer 131, the reinforcement layer 111*b* is patterned to form through-holes 111*i* to communicate with the through-holes 111*f* formed in the electrode layer 111*a*.

Figure 12E:
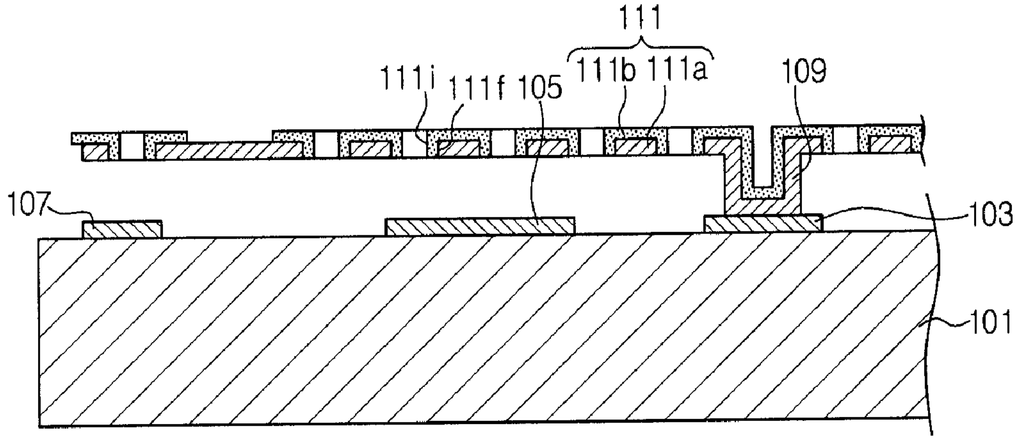

Finally, the sacrifice layer 131 is removed by an etching process performed through the through-holes 111*i* as shown in FIG. 12E, thereby completing the MEMS switch 100.

FIGS. 13A to 13E are cross-sectional views showing steps of fabricating another MEMS switch 100 according to the exemplary embodiment of the present invention shown in FIGS. 11A and 11B.

Figure 13A:
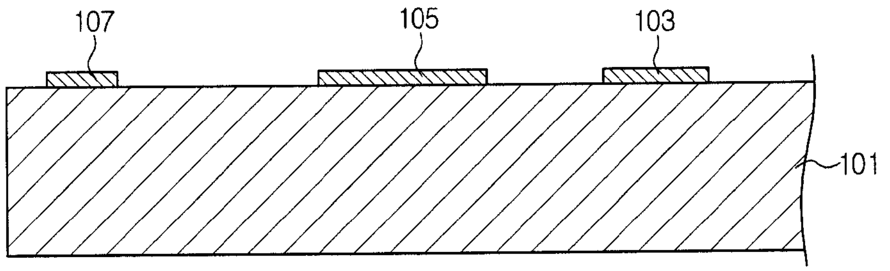
FIGS. 13A to 13E are cross-sectional views showing steps of fabricating the inventive MEMS switch 100 shown in FIGS. 11A and 11B.
Figure 13B:
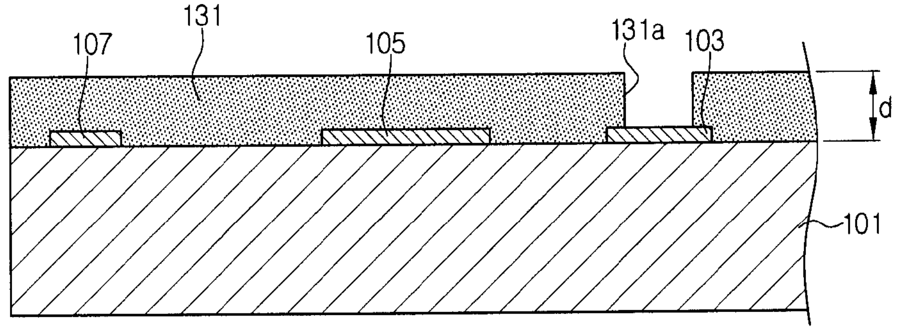

FIGS. 13A and 13B show steps until a sacrifice layer 131 is deposited on a substrate 101, which steps are equal to those shown in FIGS. 12A and 12B. Therefore, description thereof is omitted.

Figure 13C:
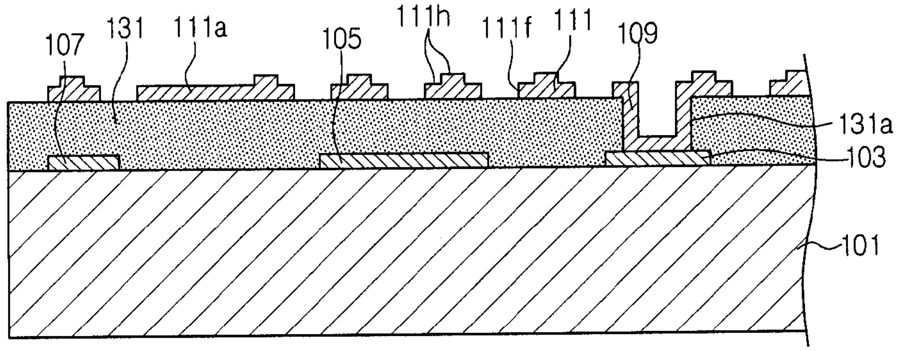

Next, aluminum is deposited on the top surface of the sacrifice layer 131 to a predetermined thickness to form an electrode layer 111*a* of a movable electrode 111, as shown in FIG. 13C. The electrode layer 111*a* is deposited while being in contact with a ground line 103 through the contact hole 131*a*. In order to increase the interface between the electrode layer 111*a* and a reinforcement layer 111*b* to be laminated in the next step, a second aluminum layer (not shown) is deposited on the previously deposited aluminum layer and then patterned to form prominence and depression parts 111*h*. In this exemplary embodiment, in order to etch the sacrifice layer 131, it is possible to pattern the electrode layer 111*a* to form through-holes 111*f*, as shown in FIG. 12C. Such through-holes 111*f* are the same as the through-holes 111*f* of FIG. 11A; they are employed for use in preventing the deformation of the movable electrode 111 as well as in etching the sacrifice layer 131.

Figure 13D:
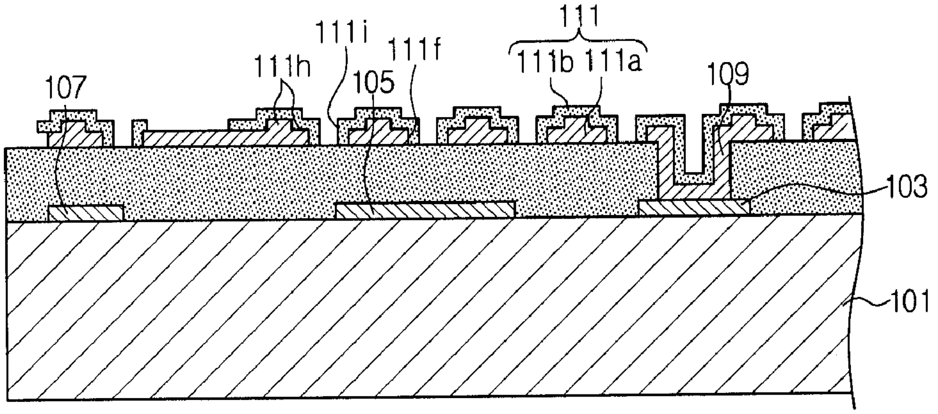

Next, silicon nitride is deposited to a predetermined thickness on the top surface of the electrode layer 111*a* formed with the prominence and depression parts 111*h* to form the reinforcement layer 111*b*, as shown in FIG. 13D. The reinforcement layer 111*b* is deposited on the top surface of the electrode layer 111*a* to the predetermined thickness in a shape complementary to the top surface of the electrode 111*a* with the prominence and depression parts 111*h*. The reinforcement layer 111*b* is also deposited on the inner circumferential surfaces of the through-holes 111*f*, thereby increasing the flexural strength of the movable electrode 111.

At this time, etching holes 111*i* are formed through the reinforcement layer 111*b* to communicate with the through-holes 111*f* of the electrode layer 111*a*.

Figure 13E:
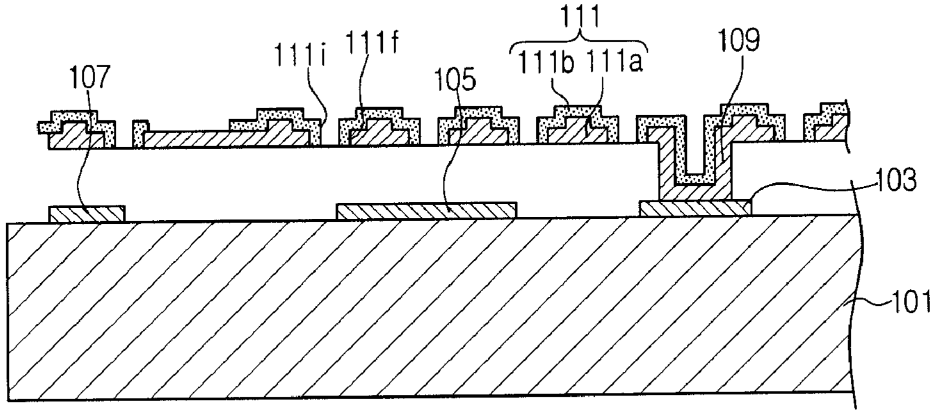

Finally, the sacrifice layer 131 is removed by an etching process performed through the through-holes 111*i* as shown in FIG. 13E, thereby completing the MEMS switch 100.

Although an arrangement, in which the movable electrode 111 comes into contact with the signal lines 107, has been described above by way of an example, the movable electrode 111 may take a form of a simple supported beam with both ends being fixed in relation to the substrate 101, a form of a cantilever with a fixed end fixed in relation to the substrate 101 and a free end opposite to the fixed end, or a form of a membrane entirely fixed in relation to the substrate 101.

A micro thin-film structure configured as described above has an advantage of minimizing the deformation of the micro thin-film structure.

In addition, if a micro thin-film structure configured as described above is applied to a movable electrode of an MEMS switch, there is an advantage in that the deformation of the movable electrode can be minimized and thus the switching operation of the MEMS switch can be stably performed.

While exemplary embodiments of the present invention have been shown and described in order to exemplify the principle of the present invention, the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A micro thin-film structure, comprising at least two thin-films having different physical properties and laminated in sequence to form an upper layer and a lower layer, wherein the lower layer is formed with plural through-holes, and the upper layer is formed to extend on inner circumferential surfaces of the plural through-holes as well as on a top side of the lower layer, and wherein second through-holes are formed in the plural through-holes of the lower layer to make the upper layer communicate with the lower layer by the upper layer and have no bottoms thereof; and wherein the upper layer is formed as a single, continuous layer; and a lower end of the supper layer extending on the inner circumferential surfaces of the plural through-holes is the same level as that of a bottom surface of the lower layer.

2. A micro thin-film structure as claimed in claim 1, wherein at least one of the first and the second through-holes are formed in a shape comprising at least one of polygonal, circular and elliptical shapes.

3. A micro thin-film structure as claimed in claim 1, wherein the second through-holes traverse the entire length of the first through-holes so that the first through holes do not have bottoms.

* * * * *